United States Patent
Vafidis et al.

(10) Patent No.: US 7,758,468 B2
(45) Date of Patent: Jul. 20, 2010

(54) INTEGRATED POWER TRAIN CONTROL SYSTEM FOR A MOTOR VEHICLE

(75) Inventors: Constantinos Vafidis, Orbassano (IT); Gianluca Morra, Orbassano (IT); Giancarlo Osella, Orbassano (IT); Corrado Elia, Orbassano (IT); Gianpiero Einaudi, Orbassano (IT); Aldo Perotto, Orbassano (IT); Savino Luigi Lupo, Orbassano (IT); Michele Pennese, Orbassano (IT)

(73) Assignee: CRF Societa Consortile per Azioni, Turin (IT)

( * ) Notice: Subject to any disclaimer, the term of this patent is extended or adjusted under 35 U.S.C. 154(b) by 181 days.

(21) Appl. No.: 11/405,475

(22) Filed: Apr. 18, 2006

(65) Prior Publication Data

US 2006/0258505 A1 Nov. 16, 2006

(30) Foreign Application Priority Data

Apr. 18, 2005 (EP) .................................. 05425238

(51) Int. Cl.
- B60W 10/04 (2006.01)
- B60W 10/08 (2006.01)
- G06F 19/00 (2006.01)

(52) U.S. Cl. .............................. 477/115; 477/4; 701/54
(58) Field of Classification Search ................. 477/3–6, 477/71, 77, 107, 115; 180/65.2–65.7; 903/925
See application file for complete search history.

(56) References Cited

U.S. PATENT DOCUMENTS

| | | | | |
|---|---|---|---|---|
| 5,941,810 A | * | 8/1999 | Gay | 494/53 |
| 5,951,614 A | * | 9/1999 | Tabata et al. | 701/54 |
| 6,054,844 A | * | 4/2000 | Frank | 322/16 |
| 6,159,127 A | | 12/2000 | Loeffler et al. | |
| 6,389,346 B1 | | 5/2002 | Gianoglio et al. | |
| 6,543,561 B1 | | 4/2003 | Pels et al. | |
| 7,028,795 B2 | * | 4/2006 | Tabata | 180/65.2 |
| 2001/0056320 A1 | | 12/2001 | Kato et al. | |
| 2002/0066607 A1 | | 6/2002 | Levin | |
| 2003/0143957 A1 | * | 7/2003 | Lyon | 455/67.1 |
| 2003/0205867 A1 | * | 11/2003 | Coelingh et al. | 280/5.5 |
| 2003/0037977 A1 | | 12/2003 | Tatara et al. | |

(Continued)

FOREIGN PATENT DOCUMENTS

DE 19648055 A1 6/1998

(Continued)

Primary Examiner—Roger Pang
(74) Attorney, Agent, or Firm—Sughrue Mion, PLLC (57) ABSTRACT

A powertrain control system for management and supervision of engine and servo-assisted gearbox control modules is arranged for determining the power to be applied to the drive wheels of the vehicle as a function of signals indicative of commands imparted by the driver, of the engine and gearbox state parameters and of possible requirements from the engine and gearbox control modules and supplementary on board vehicle traction/drive control systems; calculating data indicative of the torque to be delivered at the engine drive shaft, the torque transmissible by the clutch and the required transmission ratio, as a function of the determined value of the power to be applied to the drive wheels, of the state parameters and of the requirements of the engine and gearbox control modules and the traction/drive control systems; and transmitting the calculated data as signals to the engine and gearbox control modules.

15 Claims, 3 Drawing Sheets

U.S. PATENT DOCUMENTS

| | | |
|---|---|---|
| 2004/0034460 A1* | 2/2004 | Folkerts et al. ................. 701/54 |
| 2004/0135670 A1* | 7/2004 | Guba ........................ 340/5.21 |
| 2005/0154506 A1* | 7/2005 | Takamatsu ..................... 701/1 |

FOREIGN PATENT DOCUMENTS

| | | |
|---|---|---|
| DE | 19726214 A1 | 12/1998 |
| DE | 10100007 A1 | 7/2001 |
| EP | 0 906 526 B1 | 12/1997 |
| WO | 01/02210 A1 | 1/2001 |

\* cited by examiner

INTEGRATED POWER TRAIN CONTROL SYSTEM FOR A MOTOR VEHICLE

FIELD OF THE INVENTION

The present invention relates to a powertrain control system for a motor vehicle, and more specifically to a control system of the type defined in the pre-amble of Claim 1.

BACKGROUND OF THE INVENTION

In the prior art the powertrain control in a motor vehicle takes place by interpreting the driver's command, imparted by means of the accelerator pedal, and translating this command into a request signal for a drive torque delivered by the engine itself as a function of the speed of rotation of the drive shaft. The power or the torque which is effectively applied to the drive wheels depends not only on the drive torque thus delivered from the engine, but also on the gear ratio selected at the gearbox.

In a motor vehicle with a servo-assisted gearbox and architecture of manual type the commands imparted by the driver through the accelerator pedal, and possibly also the brake pedal, and the commands (via push button or lever) for selection of the transmission ratio, are interpreted by a gear management unit for selection of the transmission ratio and actuation of the clutch.

In International Patent Application WO 01/02210 in the name of the same Applicant, there is described a powertrain control system for a motor vehicle which makes it possible to manage the engine with a greater degree of freedom than with conventional systems. This control system is applied to the integrated traction control of a motor vehicle provided with a gearbox having servo-assisted gears including an input shaft connectable to the drive shaft by means of a servo-controlled clutch, and in which respective electrically controlled actuators are associated with the gearbox and the clutch.

In motor vehicles provided with gearboxes of the servo-assisted or 'robotised' type, traction control, i.e. control of the power or torque applied to the drive wheels and exchanged with the ground, is the combined result of the command imparted by the driver via the accelerator pedal and the gear ratio or 'speed' selected by the driver. In the case of drivers who are not particularly expert, traction control, i.e. control of the torque effectively applied to the drive wheels and exchanged with the ground, is not in general optimal in such motor vehicles.

An integrated powertrain control system has therefore been designed, based on the idea of controlling via the accelerator pedal, not the drive torque delivered by the propulsion unit, but rather directly the power applied to the drive wheels of the vehicle, exploiting for this purpose the automatic management of the gearbox. In other words, the driver does not just control the engine via the accelerator pedal, but rather also manages the dynamics of movement of the vehicle.

Even in the most highly developed prior art mentioned above, it happens that the integrated engine/gearbox control essentially consists in putting the well known strategies of 'engine control' and 'gearbox control' side by side, each of these being separately managed by an associated electronic control unit designed separately.

The said architecture presents various disadvantages.

In a system with two separate control units, respectively for the engine and the gearbox, the torque release and reinstatement operations are performed in a non-optimised manner. In fact, the engine responds to the torque demands communicated by the gearbox control unit without knowing the type of manoeuvre required (dynamics, times, jerk, . . . ) with negative effects on the speed and precision of response of the engine itself. In the same way the gearbox control unit sets the torque release and reinstatement ramps without knowing the real requirements or constraints of the engine (warm up, maximum real power, additional resistant loads, . . . ), which therefore is not always able to satisfy the requirements of the gearbox.

Moreover, in a motor vehicle provided with a plurality of on board accessory systems for automatic traction control, for the aid of the driver, these can present torque demands to the engine simultaneously and in conflict with one another.

For example, a situation of this type occurs when during starting from rest on slippery surfaces such as icy ground.

In this case, the acceleration command imparted by the driver through the accelerator pedal has superimposed thereon an engine torque reduction command from an anti-slip system (ASR) of the vehicle.

The ASR system, in reducing the engine torque demand with respect to that required by the driver, acts in parallel with the gear control system, and in particular with reference to a clutch-engaged condition. This, however, does not represent a real operative condition when starting from rest, in which the torque delivered by the engine is modulated by the clutch which is not completely engaged.

By undertaking a dialogue with the engine control unit, the gear control system reacts to the torque reduction command imparted by the ASR system, controlling rapid engagement of the clutch in such a manner that by the effect of the coupling of the propulsion unit with the transmission, the engine is the only 'actuator' able to modulate the torque at the wheels and therefore to satisfy the requirements of the ASR system. It is evident in this case that the first action performed in response to the request from the ASR system goes in the opposite direction from the objective of reducing the traction torque at the wheels in the shortest time.

SUMMARY OF THE INVENTION

The object of the invention is therefore to provide an integrated powertrain control system which makes it possible to avoid the separate conventional management modes for control of the engine (more generally, of a prime mover and any possible auxiliary engine) and control of the gearbox, permitting an improved and at the same time more direct control of the power applied to the drive wheels, an improved driving comfort, particularly, via an optimised management of starting from rest and gear changes manoeuvres and optimisation of the use of the engine for pre-determined objectives such as the reduction in fuel consumption and/or exhaust emissions.

A further object of the invention is to provide an integrated powertrain control system which can also be employed for hybrid traction vehicles, in particular those with an electric motor associated with an internal combustion engine.

These and other objects are achieved according to the invention with an integrated control system as claimed.

Particular embodiments form the subject of the dependent claims.

In summary, the principle of the invention resides in the use of an architecture including a module suitably adapted to the management and supervision of the vehicle powertrain system, that is to say the engine control unit and the gearbox control unit, so that integration of the engine/gearbox control does not consist in the simple sharing of the strategies of current 'engine control' and 'gearbox control' into a single unit, but achieves a true and proper integrated management of the two systems, wherein the supervision module receives commands imparted by the driver, for example through the accelerator pedal and gear lever or selector, as well as the demands of the various accessory control systems on board the vehicle (ABS, ASR, VDC and others)—that is to say demands for (alteration of) torque applied to the drive wheels and exchanged with the ground—and provides commands to the control modules and actuators dependant on it, for the management of the torque delivery and management of the transmission ratio.

BRIEF DESCRIPTION OF THE DRAWINGS

Further characteristics and advantages of the invention will become apparent from the following detailed description, given purely by way of non-limitative example, with reference to the attached drawings, in which.

DETAILED DESCRIPTION OF A PREFERRED EMBODIMENT

Figure 1:
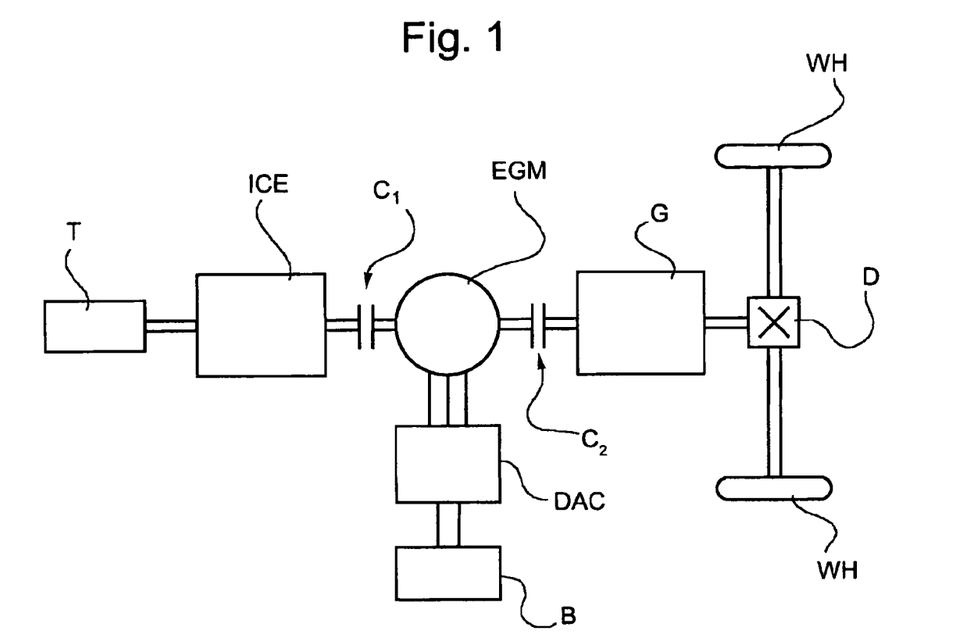
FIG. 1 is a schematic representation of a powertrain system for a motor vehicle with electrically assisted traction.

In FIG. 1 the reference ICE indicates an internal combustion engine of a motor vehicle having a fuel tank T. A reversible electric machine, indicated EGM, is disposed downstream of the internal combustion engine, to which it is coupled via a first clutch $C_1$. By means of a second clutch $C_2$ the electric machine and the thermal engine are coupled to a gearbox G of servo-assisted type, connected to a differential D for transmission of drive to the drive wheels WH of the vehicle.

In the example illustrated the electric machine EGM is coupled to an energy storage device such as a battery B through an electric energy conversion device DAC such as a DC/AC converter.

Naturally, the architecture illustrated refers to a currently-preferred embodiment and is only one of the possible arrangements, in which the reversible electric machine is shown on the same axis as the thermal engine and contributes to the traction, but it will be understood that an equivalent system could include an electric machine of the starter-alternator type, coupled to the thermal engine by means of a transmission belt, for starting and possible recovery of the kinetic energy upon braking (depending on the size of the electric machine), an electric machine arranged to contribute to the traction by acting on the wheels which are not driven by the thermal engine (for example, for the formation of a propulsion system having four driven wheels) or a combination of these.

In a more general arrangement, and without departing from the principles of the invention, any prime mover may be substituted for the internal combustion engine, including a motor or other suitable torque delivering means, such as hybrid or fuel cells engines. Besides, a non reversible electric machine or any other auxiliary torque delivering means may be coupled to the prime mover, instead of a reversible electric machine.

In the following, the term "engine" will be used as referring generally to any machine in which power is applied to do work by the conversion of various forms of energy (i.e., not only thermal but also electrical or chemical energy) into mechanical force and motion.

In a simplified architecture, the vehicle powertrain system need not include any electric machine, so that it comprises exclusively a prime mover, such as the internal combustion engine ICE, to the drive shaft of which the servo-assisted gearbox G is directly coupled by means of a single servo-controlled clutch ($C_1$).

The following description will be based by way of example on the architecture illustrated in FIG. 1, able to manage a hybrid propulsion, that is to say one comprising electrically assisted traction, included partial energy recovery during braking phase. This architecture makes advantageously possible in the future further integration of the control of the braking system and control of the vehicle steering system.

Figure 2:
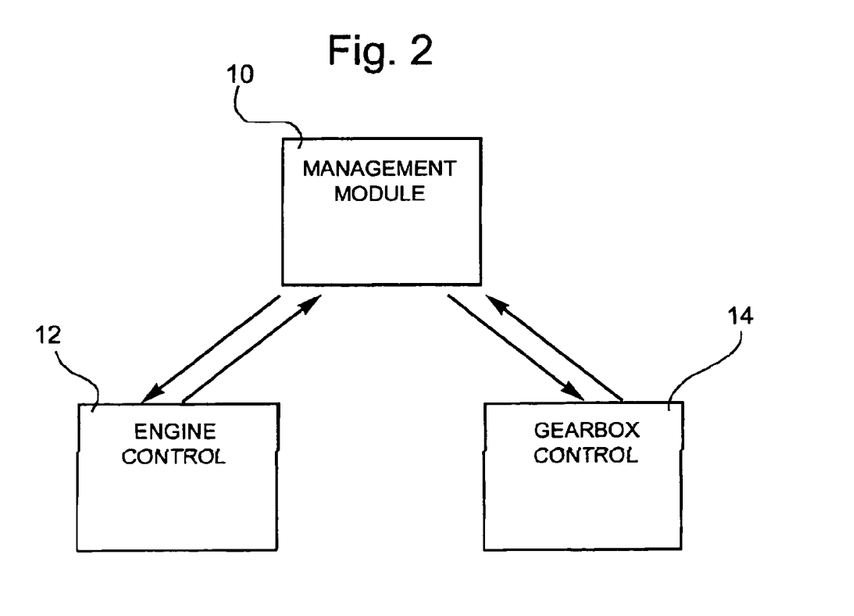
FIG. 2 shows a diagram of the principle of the integrated control system forming the subject of the invention.

The diagram of FIG. 2, shows, in summary, the principle of management of the powertrain of the motor vehicle according to the integrated control system forming the subject of the invention.

A traction management processing module 10 is employed as a supervision module for control of the engine (for example of the thermal engine and motor if more than one engine is present in the case of hybrid traction) and the vehicle gearbox.

It exchanges data with an engine control module 12 operable to manage the operation of the thermal engine and the electric motor (where provided) for achieving the required torque, and a gearbox control module 14 operable to manage the operation of the gear change, thus controlling the actuation of the clutch and the selection of the transmission ratios in a servo-assisted manner according to predetermined management strategies. The interactions between the modules 12 and 14 are always coordinated by the traction management module 10.

Figure 3:
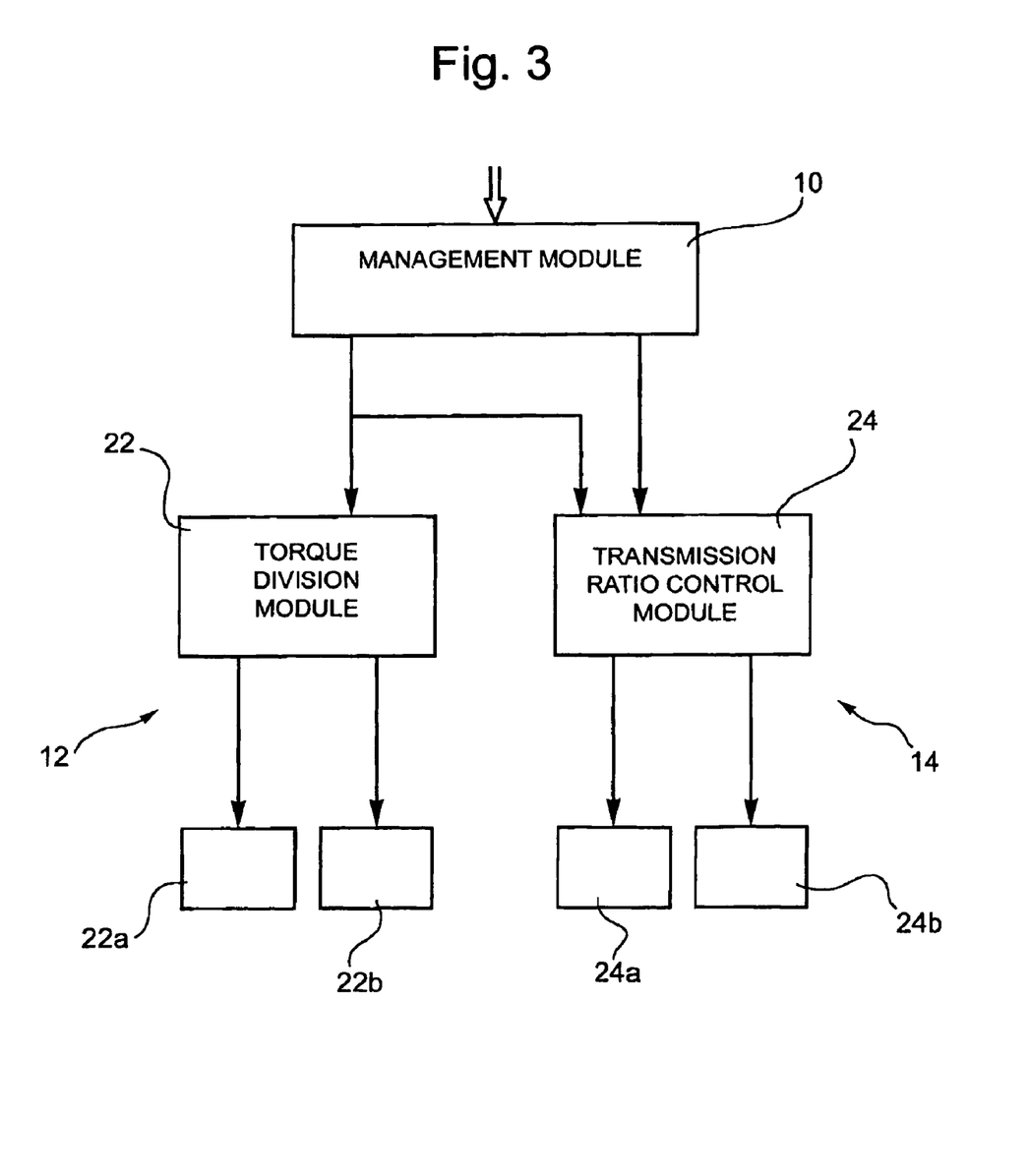
FIG. 3 is a block diagram showing one way in which the principle of FIG. 2 can be put into practice.

The outline diagram of FIG. 2 is explained in more detail in FIG. 3.

The supervision and management module 10 is able to receive in input signals or data indicative of the powertrain commands imparted by the driver and the possible demands for modification of the required torque/power coming from the gearbox control unit and/or from onboard traction/direction control accessory systems as well as signals or data indicative of pre-established vehicle state parameters.

A calculation unit (not shown) is associated therewith, in which are stored data able to define the power to be applied to the drive wheels of the vehicle, the transmission ratio and the target jerk (temporal variation of the longitudinal acceleration of the vehicle) when moving off from rest and changing gear as a function of the magnitude of the commands imparted by the driver and of pre-established vehicle state parameters (for example, the speed of forward movement). The supervision and management module 10 is therefore arranged to determine the torque (power) which the drive wheels must deliver (torque exchanged with the ground), the transmission ratio and the jerk on the basis of data stored in the said calculation unit.

The supervision module 10 is connected to a torque division management module 22, to which it transmits data or signals of torque required at the engine drive shaft, and to a transmission ratio management module 24, to which it transmits signals or data indicative of the target transmission ratio, of the target drive shaft torque and the target jerk.

The torque division management module 22 and the transmission ratio management module 24 are preferably integrated into a single physical control unit since their formation as separate units (however, not excluded by the present invention) would involve a reduction in the performance of the system with regard, in particular, to the CAN network communication and access times.

The torque division management module 22 is in turn coupled to a module 22a for control of the internal combustion engine ICE, to which it transmits signals or data indicative of the target torque required of this engine, and to a control unit 22b for the electric machine EGM to which it transmits signals or data indicative of the target torque required of this machine.

The transmission ratio management module 24 is in turn coupled to a clutch control module 24a to which it transmits signals or data indicative of the target torque transmissible by the clutch (or clutches), and to a transmission ratio control module 24b to which it transmits signals or data indicative of the target transmission ratio.

Figure 4:
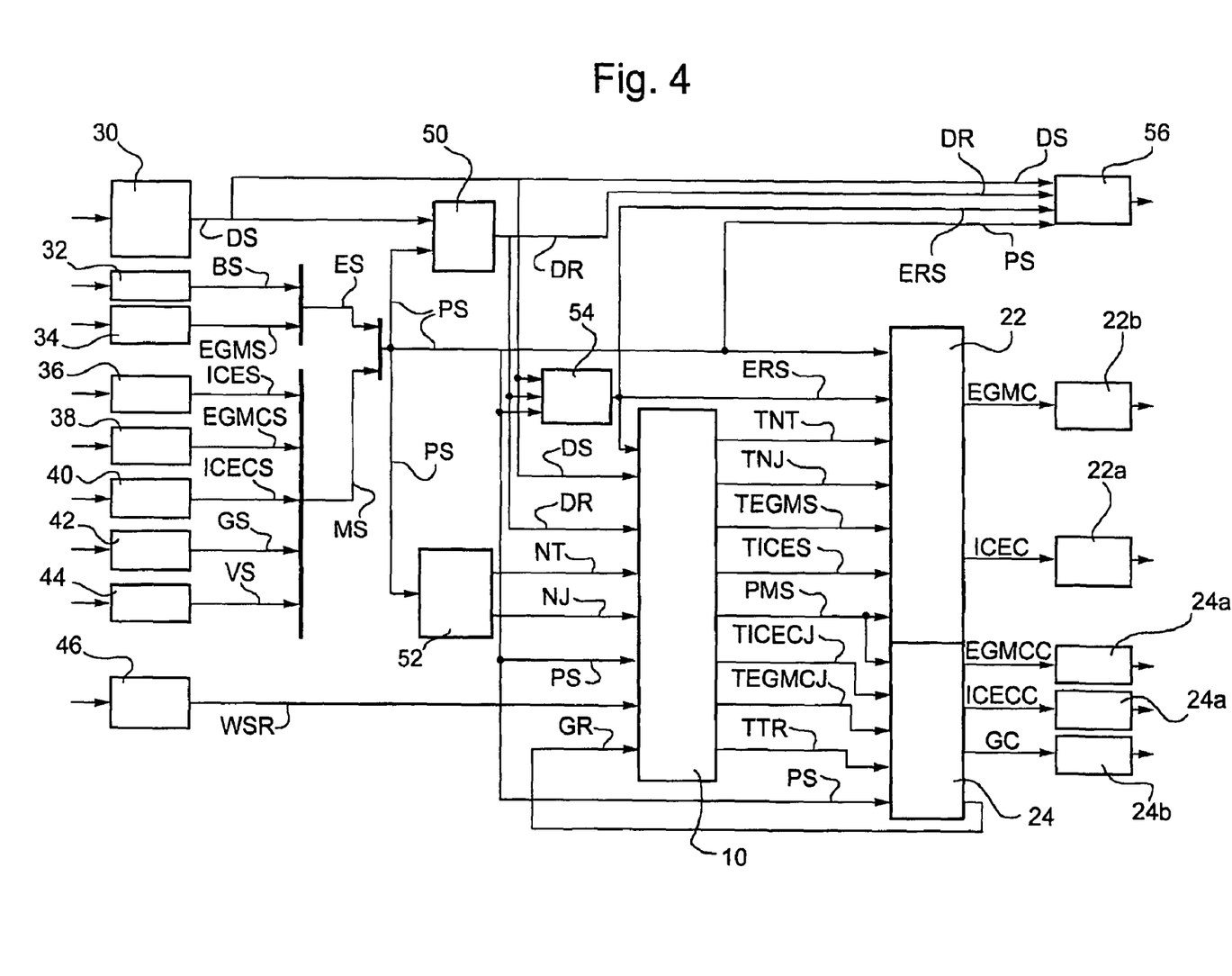
FIG. 4 is a detailed block diagram of the functional architecture of the system forming the subject of the invention.

The architecture of FIG. 3 is described in more detail in FIG. 4 where the interface blocks, integrated traction management and actuator control blocks are shown in more detail.

At the left hand side of the drawing is shown a plurality of system interface blocks, that is to say modules arranged for the measurement or estimation or extraction of information and parameters indicative of the state of the vehicle, among which are parameters indicative of the state of the torque actuators and the commands of the driver. These include, preferably but not exclusively:

- an interface module 30 interfacing with the driver's driving commands (for example detected via the pedals and the gear selector), operable to generate a state signal DS representing the commands imparted by the driver;
- a battery interface module 32 operable to generate a signal BS indicative of the state of the battery on board the vehicle;
- an interface module 34 for the measurement/estimation of the physical state of the electric machine EGM, operable to generate a signal EGMS indicative of the state of the machine;
- an interface module 36 for the measurement/estimation of the physical state of the internal combustion engine ICE, operable to generate a signal ICES indicative of the state of the engine;
- an interface module 38 for the measurement/estimation of the components of the state of the clutch $C_2$ (where provided) of the electric machine EGM, operable to generate a corresponding signal EGMCS;
- an interface module 40 for the measurement/estimation of the components of the state of the clutch $C_1$ of the thermal engine ICE, operable to generate a corresponding signal ICECS;
- an interface module 42' for the measurement of the gearbox state components, operable to generate a signal GS indicative of the state of the gearbox (transmission ratio);
- an interface module 44 operable to detect the state of the vehicle (via measurement or estimation), for example the steering condition, the slope of the road, the longitudinal velocity, the longitudinal/transverse acceleration, and operable to emit a corresponding signal VS; and
- an interface module 46 for interfacing with on board supplementary control systems acting on the vehicle wheels, such as the brake control system (ABS), anti-slip system (ASR) and stability system (ESP), operable to emit a signal WSR indicative of the state of the drive wheels.

The signals BS and EGMS, respectively indicative of the state of the battery and of the electric machine are conveniently grouped into an overall signal ES indicative of the electric state of the vehicle.

The signals ICES, EGMCS, ICECS, GS and VS, respectively indicative of the state of the internal combustion engine, the state of the clutches of the internal combustion engine and the electric machine, the state of the gearbox and the state of the vehicle, are conveniently grouped into an overall signal MS indicative of the mechanical state of the vehicle.

The signals ES and MS, indicative of the electric state and the mechanical state of the vehicle are finally further combined to form an overall signal PS indicative of the physical state of the vehicle.

The signal PS is provided to a first input of a driver command interpretation module, generally indicated 50, having a second input to which the signal DS is supplied.

The signal PS is further supplied to a state consolidation module 52, typically the delivered torque provided by the thermal engine and electric motor (hybrid traction) at the input shaft of the gearbox.

The module 52 emits a signal NT indicative of the actually delivered net torque, and a signal NJ indicative of the actually delivered net jerk, to the traction supervision and management module 10.

The module 10 also receives at its input the signal DS indicative of the state of the driver-imparted commands, the signal DR emitted by the module 50 which interprets the driver commands, the signal PS indicative of the physical state of the vehicle, the signal WSR indicative of the state of the drive wheels, a signal ERS indicative of the state of the electrical requirements, generated by an electric energy management module 54 on the basis of the signals DS, DR and PS, and finally a signal GR indicative of the torque demands coming from the transmission ratio control module 24.

By providing, at the input to the traction supervision and management module, the signal GR indicative of the torque demands by the transmission ratio control module it is possible advantageously to take account of the torque demands by the gearbox as an alternative to those of the driver in determination of the torque (power) which the drive wheels must deliver, integrating the demands related to the manoeuvres of management of the gearbox (for example start from rest and gear change) in the main calculation chain of the engine control targets.

In detail, the torque division management module 22 receives at its input the signals PS, ERS and a plurality of signals emitted by the supervision module 10, respectively a signal TNT indicative of the net target torque, a signal TNJ indicative of the net target jerk, a signal TEGMS indicative of the target speed of rotation of the electric machine, a signal TICES indicative of the target speed of rotation of the internal combustion engine drive shaft, and a signal PMS indicative of the functioning state in which the powertrain management automation system currently finds itself.

The transmission ratio management module 24 also receives the signal PS and a plurality of signals emitted by the supervision module 10, comprising the signal PMS, a signal TICECJ indicative of the target jerk at the thermal engine clutch, a signal TEGMCJ indicative of the target jerk at the electric machine clutch and a signal TTR indicative of the target transmission ratio.

The module 22, as already illustrated in FIG. 3, provides a signal EGMC indicative of the commands to the electric machine EGM, to the electric machine control unit 22b, and a signal ICEC indicative of the commands to the thermal engine ICE, to the thermal engine control unit 22a.

The module 24, as already illustrated in FIG. 3, provides a pair of signals EGMCC and ICECC, respectively indicative of the clutch commands of the electric machine and the thermal engine, to a pair of control units 24a of the respective clutches, as well as signal GC indicative of the commands to the gearbox, to the transmission ratio control unit 24b.

The module 24 also emits the signal GR indicative of the transmission ratio requirements, supplied in feedback to the supervision module 10.

Finally, the system includes an output interface module 56 for the driver, operable to receive the signals DS, DR, ERS and BS at its input and arranged to inform or alert the driver, for example by display of the transmission ratio engaged, the state of the 'cruise control' command, and the diagnostic state of the powertrain unit.

The system forming the subject of the invention therefore allows integration between the control of the gearbox and that of the engine during manoeuvres in which the management of the engine torque demand is defined by requirements related to the control of the transmission (start from rest and gear change).

The requirements of the gearbox control unit, as well as those of the supplementary traction/drive control systems on board the vehicle such as ABS, ASR, ESP, VDC etc, are not transferred directly to the engine control unit but sent to the supervision module which unites them with the commands imparted by the driver and then transfers them to the engine control unit for control of the torque delivered by the thermal engine, and possibly by the electric machine.

The system described allows integration of the control of the gearbox and of the engine both in clutch-engaged conditions and in torque release and re-engagement operations during gear change manoeuvres, for example with techniques described in European Patent EP 0 906 526 B1 by the same Applicant.

Advantageously, the integration of the requirements related to the gearbox management manoeuvres (start from rest and gear change) into the main calculation chain of the engine control targets (net torque and target running conditions), that is to say, in general, integration between engine and gearbox of the drivability over the ground shows itself in a greater ease of use of the vehicle, greater fuel economy (being/able to use systems of the 'stop and start' type, servo-assisted gear changes and hybrid traction and, in general, to optimise the energy management of the motor vehicle), in greater speed of response to acceleration commands (therefore greater comfort, performance and driving security), in the absence of oscillations in the longitudinal acceleration of the vehicle following movements of the accelerator pedal or changes of transmission ratio, and in obtaining a continuity of the traction even following a significant variation in the level of acceleration between different operating conditions and in correspondence with 'traction holes' related to the gear change manoeuvre.

As discussed up to now the propulsion system of the vehicle can include, in an exemplary embodiment, both a thermal engine and an electric motor, and in this latter case a system of starter-alternator type is currently preferred.

The use of such a system makes it possible to manage a series of innovative functions with respect to conventional solutions, as described hereinafter. These functions make it possible to obtain substantial advantages in terms of reduction in fuel consumption and polluting emissions/acoustic emissions and require that these effects on the driveability of the vehicle are managed at the integrated architectural level.

With reference to FIGS. 3 and 4 the principal functions obtained by the integrated control system forming the subject of the invention are shown.

The logic subsystem for control of the power of the vehicle, including a portion of the supervision module 10 and the torque division management module 22, receives at its input, through the interface module 30, a signal indicative of the position of the accelerator pedal as a function of the command imparted by the driver and, via the interface module 44, a signal indicative of the longitudinal velocity v of the vehicle, and is operable to generate, among others, a signal indicative of the torque required at the engine drive shaft.

The logic subsystem for control of the gearbox, including a portion of the supervision module 10 and the transmission ratio management module 24, receives at its input the signal indicative of the target power required by the power control subsystem, the vehicle's longitudinal velocity signal v, a signal indicative of the state of the vehicle (for example slope, steering, braking) coming from sensors or estimators on board, and is operable to generate, among others, a signal indicative of the required transmission ratio.

Additional functions are achieved by providing within the supervision module 10 a sub-module arranged for the control of the powertrain in pre-determined operating conditions, operable to generate an associated control signal for the thermal engine clutch and the electric motor clutch, and a control signal (starting/stopping) of the electric machine.

This sub-module, specifically, manages, below a defined reference speed of the vehicle, the actuation of a stop-start function in which, in the stop phase the internal combustion engine is uncoupled from the transmission and extinguished in pre-determined vehicle operating conditions, and in a subsequent start phase is automatically restarted via the electric machine functioning as a motor and then re-coupled to the transmission. The sub-module further manages, preferably, a 'free wheel' function in which the internal combustion engine is decoupled from the transmission and extinguished in operating conditions of the vehicle in which the accelerator pedal is released and the speed of the vehicle lies between a pair of pre-determined threshold values, and in a subsequent phase is automatically restarted and re-coupled to the transmission upon the occurrence of predetermined operating conditions, for example upon subsequent pressure on the accelerator pedal.

Naturally, the principle of the invention remaining the same, the embodiments and details of construction can be widely varied with respect to what has been described and illustrated purely by way of non-limitative example, without by this departing from the scope of protection of the present invention defined by the attached claims.

What is claimed is:

1. A powertrain control system for a motor vehicle provided with
at least one engine with which are associated first control means operable to control it in such a way that the said engine delivers a variable drive torque; and
a gearbox of servo-assisted type, connectable to a drive shaft of the engine via at least one servo-controlled clutch with which are associated second control means operable to control the said gearbox and the said clutch in such a way as to effect engagement and disengagement of selected transmission ratios;
the said first and second control means being arranged to perform an automatic traction control procedure as a function of signals or data indicative of commands imparted by a driver of the motor vehicle, and pre-established parameters of the state of the engine and of the gearbox;

the system including vehicle powertrain management processor means for management and supervision of the interactions between the said first and second control means, wherein interactions between the said first and second control means only occur via the vehicle powertrain management processor; and wherein the vehicle powertrain management processor is arranged for:

determining, in a predetermined manner, the power to be applied to the drive wheels of the vehicle as a function of the said signals or data indicative of commands imparted by the driver, of the said state parameters and of possible requirements of the said first and second control means and/or of supplementary onboard traction/drive control systems of the vehicle;

calculating, as a function of the determined value of the power to be applied to the drive wheels, of the said state parameters and of the said requirements from the said first and second control means and/or from the said traction/drive control systems, the transmission ratio to be selected at the gearbox, the torque transmissible by the clutch of the gearbox and the torque required at the engine drive shaft for each operative condition of the gearbox and transmitting respective signals or data indicative of the torque to be delivered at the engine drive shaft, the torque transmissible by the clutch and the transmission ratio required to the said first and second control means respectively, wherein the system comprises a plurality of interface modules arranged for the measurement, estimation or extraction of said signals or data indicative of the state of the vehicle and of the commands by the driver, including:

a driver interface module operable to generate a state signal (DS) representing the commands imparted by the driver;

a battery interface module operable to generate a signal (BS) indicative of the state of a battery on board the vehicle;

a first torque delivering state interface module operable to generate a signal (ICES) indicative of the physical state of a prime mover;

a second torque delivering state interface module operable to generate a signal (EGMS) indicative of the physical state of auxiliary torque delivering means;

a first clutch state interface module operable to generate a signal (ICECS) indicative of the state of a clutch associated with the prime mover;

a second clutch state interface module operable to generate a signal (EGMCS) indicative of the state of a clutch associated with the auxiliary torque delivering means (EGM);

a gearbox interface module operable to generate a signal (GS) indicative of the state of the gearbox;

a vehicle interface module for detecting the state of the vehicle, and operable to generate a signal (VS) indicative of the state parameters of the vehicle; and a control systems interface module associated with on board supplementary control systems acting on the vehicle wheels, and operable to generate a signal (WSR) indicative of the state of the drive wheels of the vehicle, the signals (BS, EGMS) indicative of the state of the battery and of the auxiliary torque delivering means being grouped into an overall signal (ES) indicative of the electric state of the vehicle, the signals (ICES, EGMCS, ICECS, GS and VS) indicative of the state of the prime mover, the state of the clutches of the prime mover and the auxiliary torque delivering means, the state of the gearbox and the state of the vehicle being grouped into an overall signal (MS) indicative of the mechanical state of the vehicle, the signals (ES, MS) indicative of the electric state and the mechanical state of the vehicle being combined to form an overall signal (PS) indicative of the physical state of the vehicle, wherein the signal (PS) indicative of the physical state of the vehicle is provided to a first input of a driver command interpretation module receiving at a second input the state signal (DS) representing the commands imparted by the driver, wherein the signal (PS) indicative of the physical state of the vehicle is provided to a state consolidation module, and wherein the signal (DS) representing the commands imparted by the driver and the signal (PS) indicative of the physical state of the vehicle, together with a signal (DR) generated from the driver command interpretation module, are provided to an electric energy management module, arranged to generate a signal (ERS) indicative of the state of the electrical requirements, whereby said powertrain management processor means is arranged to receive a signal (NT) indicative of the delivered net torque and a signal (NJ) indicative of the delivered net jerk from the state consolidation module, the signal (DR) from the driver command interpretation module, the signal (DS) indicative of the state of the driver commands, the signal (PS) indicative of the physical state of the vehicle, the signal (WSR) indicative of the state of the drive wheels, the signal (ERS) indicative of the state of the electrical requirements, and a signal (GR) indicative of the torque demands from the transmission ratio control module;

whereby said first control means include a torque division management module arranged to receive at its inputs the signal (PS) indicative of the physical state of the vehicle, the signal (ERS) indicative of the state of the electrical requirements and, from said powertrain management processor means, a signal (TNT) indicative of the net target torque, a signal (TNJ) indicative of the net target jerk, a signals (TICES, TEGMS) indicative of the target speed of rotation of the prime mover and auxiliary torque delivering means, and a signal (PMS) indicative of the operating state of said powertrain management processor means, and whereby said second control means include a transmission ratio management module arranged to receive at its inputs the signal (PS) indicative of the physical state of the vehicle and, from said powertrain management processor means, signals (TICECJ, TEGMCJ) indicative of the target jerk at the respective torque delivering means clutch, a signal (TTR) indicative of the target transmission ratio, and the signal (PMS) indicative of the operating state of said powertrain management processor means.

2. A system according to claim 1, in which the said first control means comprise an engine control logic module and at least one module for actuation of the commands to the engine.

3. A system according to claim 2, in which the said second control means comprise a logic module for control of the gearbox and modules for operation of the clutch and selection of the transmission ratio.

4. A system according to claim 3, in which the said engine control logic module and gearbox control logic module are integrated into a single electronic control unit.

5. A system according to claim 2, including auxiliary torque delivery means coupled to the engine, and in that the said engine control logic module is arranged to distribute the request for delivery of torque respectively to a first command actuator module for a prime mover and to a second command actuator module for the auxiliary torque delivering means.

6. A system according to claim 5, wherein said prime mover comprises an internal combustion engine and said auxiliary torque delivering means comprise an electric machine.

7. A system according to claim 6, wherein said electric machine is a reversible electric machine, adapted to operate as a generator and as an electric motor.

8. A system according to claim 6 or 7, in which the said electric machine is interposed between the internal combustion engine and the gearbox and coupled to this latter by means of a second clutch.

9. A system according to claim 6 or 7, in which the said electric machine is arranged to act on the wheels not driven by the thermal engine.

10. A system according to claim 1, in which the said supplementary traction/drive control systems of the vehicle mounted onboard include at least one system belonging to the set comprising:
   ABS system;
   ASR system;
   ESP system;
   VDC system.

11. A system according to claim 1, in which the said state parameters comprise at least one of the parameters belonging to the set comprising:
   net torque delivered by the engine shaft;
   angular velocity of the engine shaft, of the gearbox input shaft and/or of the gearbox output shaft;
   transmission ratio engaged;
   state of the clutch and net torque transmissible by the clutch;
   achieved jerk;
   longitudinal velocity and/or acceleration of the vehicle;
   lateral acceleration of the vehicle;
   inclination of the road;
   battery state;
   required electric power.

12. A system according to claim 1, in which the said supervision and management processor means are further connected to onboard systems provided for control and actuation of vehicle braking operations, and are arranged to:
   determine, in a predetermined manner, the braking force as a function of signals or data indicative of the commands imparted by the driver, of the said state parameters and possible requirements of the said first and second control means and/or of the said onboard vehicle traction/drive control systems; and
   transmit respective signals or data indicative of the determined braking force to the vehicle braking system.

13. A system according to claim 1, in which the said supervision and management processing means are further connected to onboard systems arranged to control and perform of steering operations and are arranged to:
   determine, in a predetermined manner, the steering movements as a function of signals or data indicative of the commands imparted by the driver, the said state parameters, and possible requirements of the said first and second control means and/or of the said onboard vehicle traction/drive control systems; and
   transmit respective signals or data indicative of the determined steering movements to the said vehicle steering system.

14. A system according to claim 11, including a plurality of interface modules operable to detect the said state parameters and connected to the input of the said supervision and management processor means.

15. A system according to claim 1, including memory and calculation means associated with the said supervision and management processor means, in which are stored data able to define the power to be applied to the drive wheels of the vehicle as a function of the magnitude of predetermined commands imparted by the driver, predetermined state parameters of the vehicle and possible requirements of the said first and second control means and/or of the supplementary onboard traction/drive control systems, whereby the supervision and management means are arranged to determine the power to be applied to the drive wheels on the basis of data stored in the said memory means.

* * * * *